United States Patent

Burgoon et al.

Patent Number: 5,373,139
Date of Patent: Dec. 13, 1994

[54] APPARATUS AND METHOD FOR NARROW GROOVE WELDING

[75] Inventors: Charles E. Burgoon, Kingwood, Tex.; Roger A. Camellino, Lake Bluff, Ill.

[73] Assignee: Westinghouse Electric Corporation, Pittsburgh, Pa.

[21] Appl. No.: 23,794

[22] Filed: Feb. 25, 1993

[51] Int. Cl.⁵ ............................................. B23K 9/167
[52] U.S. Cl. ................................. 219/137 R; 219/75; 219/136
[58] Field of Search ............... 219/75, 136, 137.2, 219/137 R, 74, 61

[56] References Cited

U.S. PATENT DOCUMENTS

| | | | |
|---|---|---|---|
| 3,589,351 | 9/1971 | Shoupp et al. | 125/1 |
| 3,604,889 | 9/1971 | Rohrberg | 219/74 |
| 3,725,633 | 4/1973 | Schumacher et al. | 219/121 |
| 3,832,513 | 8/1974 | Klosson | 219/75 |
| 4,110,590 | 8/1978 | Batey et al. | 219/75 |
| 4,491,715 | 1/1985 | Voronin et al. | 219/75 |
| 4,527,038 | 7/1985 | Cuny et al. | 219/75 |
| 4,591,685 | 5/1986 | Hinger et al. | 219/74 |
| 4,599,505 | 7/1986 | Lukens et al. | 219/74 |
| 4,617,444 | 10/1986 | Engelhard et al. | 219/75 |
| 4,769,521 | 9/1988 | Sugiyama | 219/75 |
| 5,003,150 | 3/1991 | Stricklen | 219/75 |
| 5,081,334 | 1/1992 | Copher et al. | 219/74 |

FOREIGN PATENT DOCUMENTS

| | | | |
|---|---|---|---|
| 3238497 | 4/1984 | Germany | 219/61 |
| 55-81086 | 6/1980 | Japan | 219/75 |
| 57-19558 | 12/1982 | Japan . | |
| 60-12282 | 1/1985 | Japan . | |
| 60-19167 | 9/1985 | Japan . | |

OTHER PUBLICATIONS

D. J. Hsrch, PE; Narrow Groove Welding and Weld Monitoring with Adjustable Regionalized Filtration; EPRI BWR Reactor Vessel & Inspection & Repair Workshop 16–18 Jul. 1991; pp. 1–8 and FIGS. 1A thru 5B.

*Primary Examiner*—Clifford C. Shaw

[57] ABSTRACT

Narrow groove welding is practiced using conventional welding apparatus including a torch block supporting an electrode and a primary, circular gas cup which directs a first flow of cover gas along the electrode, in combination with a rectangular, secondary gas cup detachably mounted coaxially with the primary gas cup and which directs a second, greater flow of cover gas around the flow of cover gas from the primary gas cup. The broad envelope of laminar flow cover gas thus produced is effective for making deep narrow groove welds and is stable enough for completing the weld cap.

42 Claims, 8 Drawing Sheets

APPARATUS AND METHOD FOR NARROW GROOVE WELDING

BACKGROUND OF INVENTION

1. Field of Invention

This invention relates to apparatus and method for welding, and in particular to narrow groove welding using conventional welding equipment with a secondary gas cap which provides a large envelope of turbulent free cover gas over the weld puddle and which can be used to make complete deep narrow groove welds including the weld cap.

2. Background Information

Narrow groove welding is a term applied to welding in a v-shaped groove formed between the parts to be joined which has a "narrow" included angle. This technique is also referred to, especially in Europe, as narrow gap welding. While there is no precise definition of "narrow", welding with a groove having an included angle of less than about 50° and certainly less than about 20° is considered narrow groove welding. The obvious advantages of narrow groove welding are that less welding is required and it is therefore faster and uses less material. The implementation of the technique has not been totally satisfactory for field welding applications, however.

An important shortcoming of the implementations of narrow groove welding to date is that specialized equipment is required. A common arrangement for narrow groove welding utilizes a special elongated narrow gas cup referred to as a "chisel" cup. Typically, the torch block is customized to carry this chisel cup which surrounds the welding electrode and lays down an envelope of cover gas over the weld puddle. The envelope of cover gas delivered by this chisel cup is not very large and is vulnerable to drafts when outside the groove so that it is necessary to change the gas cup, and therefore, in some eases the torch block, to complete the weld cap. It also limits the operator's view of the weld puddle.

Another arrangement for narrow groove welding utilizes a specially designed circular, telescoping gas cup mounted on a customized torch block. After each several passes, the telescoping gas cup is incrementally retracted to accommodate reduction in penetration of the electrode into the groove. Typically these cups do not have sufficient cross sectional area to provide a large enough shielding envelope for welds deeper than approximately 3 inches.

There is a need for an improved apparatus and method for narrow groove welding.

There is a need for such an apparatus and method which can make deeper welds than presently possible with narrow groove welding equipment and which does not require a change in equipment to complete the weld cap and which improves the visibility to the operator.

There is a further need for such a method and apparatus which can be utilized with conventional welding torches and consumables, both mechanized and manual.

SUMMARY OF THE INVENTION

These and other needs are satisfied by the invention which is directed to apparatus and a method for narrow groove welding utilizing a welding torch block from which a welding electrode extends, a primary gas cup surrounding the electrode adjacent the torch, a secondary gas cup surrounding the primary gas cup, and gas distribution means providing a first flow of cover gas to the primary gas cup which directs it along the electrode, and a separate secondary flow of cover gas to the secondary gas cup which directs this second cover gas flow along the primary gas cup and the electrode. The welding torch, electrode and primary gas cup can be conventional equipment with the secondary gas cup being detachably secured around the first gas cup when needed for narrow groove welding. The conventional primary gas cup is normally circular, and the secondary gas cup is preferably rectangular and can be square in cross-section with a width greater than the width of the narrow groove to be welded and centered or coaxial with respect to the primary gas cup.

The secondary gas cup has a flow opening with a cross-sectional area which is at least three times, and preferably 4 to 10 times the cross sectional area of the flow opening of the primary gas cup. Additionally, the flow rate of cover gas from the secondary gas cup is at least twice, and preferably 2.5 to 10, times the gas flow from the primary gas cup. The secondary gas cup has a diffuser to distribute the flow of cover gas around the primary gas cup, and gas lens means which provides laminar flow of the cover gas. As the conventional primary gas cup also produces laminar flow, a large envelope of laminar flow cover gas is generated which provides effective cover for making deep narrow groove welds such as on the order of at least 6 to 9 inches. This large envelope of laminar flow cover gas is also stable enough that it can be used even for making the cap weld, and therefore, can also be used for making wide angle welds if desired.

The only non-conventional equipment required is the secondary gas cup and the means to distribute additional cover gas to the secondary gas cup. No special purpose torch block, electrode or primary gas cup is necessary.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS OF THE INVENTION

The invention will be described as applied to and as utilizing mechanized welding apparatus, although it will be appreciated by those skilled in the art that the invention is equally applicable to manual welding apparatus. An important feature of the invention is that it can be applied to a wide variety of currently available conventional welding apparatus.

Figure 1:
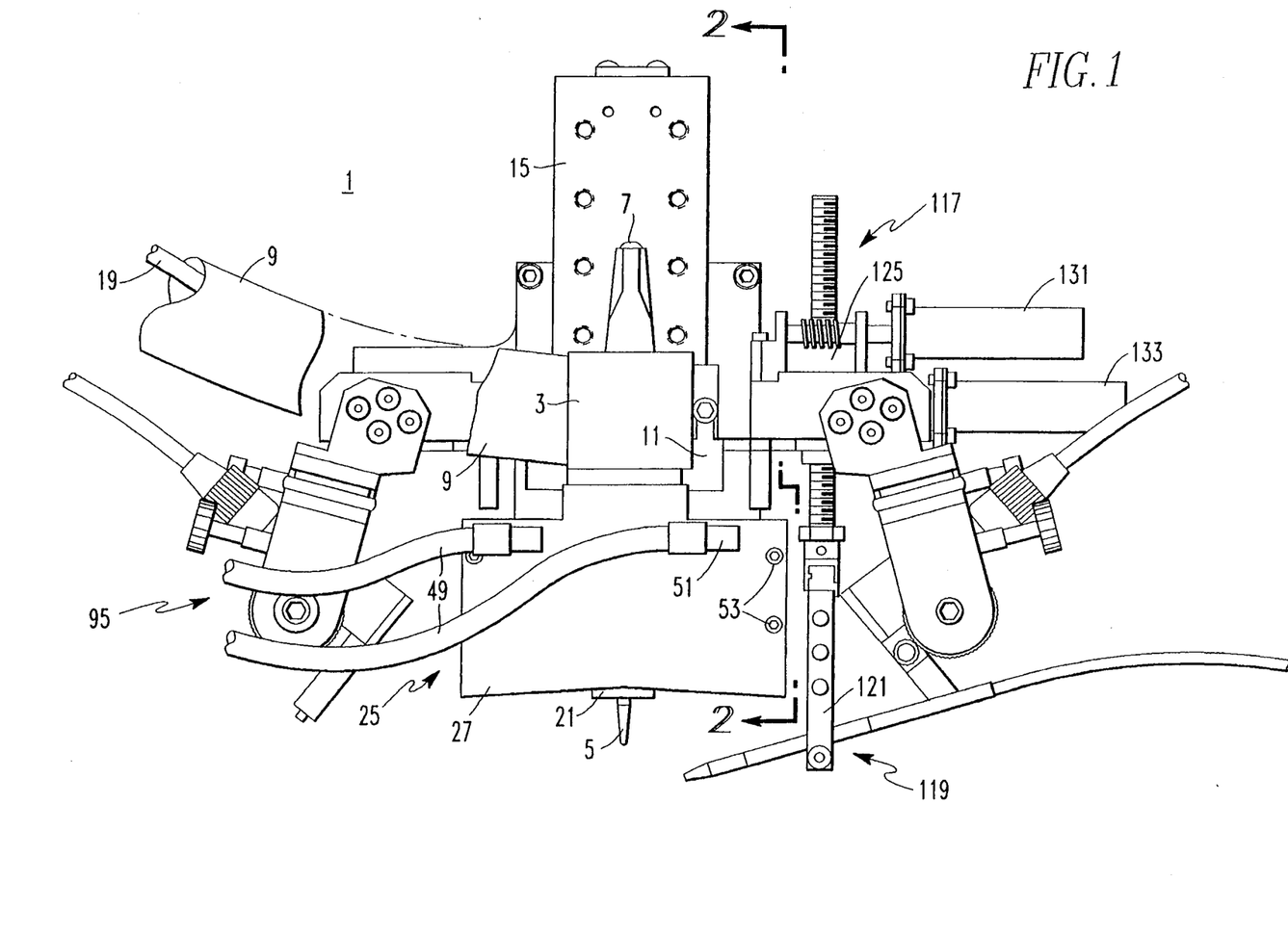
FIG. 1 is a front elevation view of a front end of a mechanized welding machine incorporating the invention.
Figure 2:
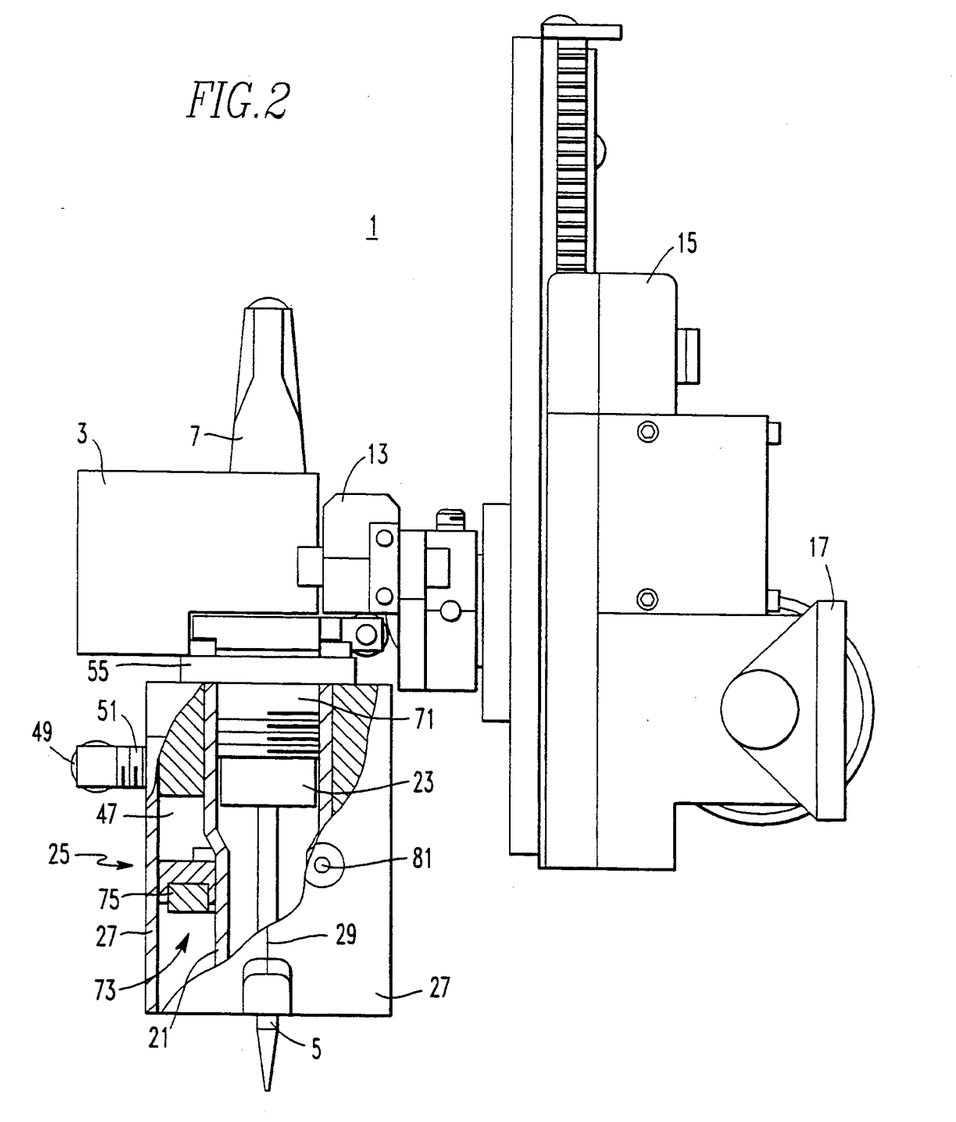
FIG. 2 is a side elevation view taken along the line 2—2 in FIG. 1.
Figure 3:
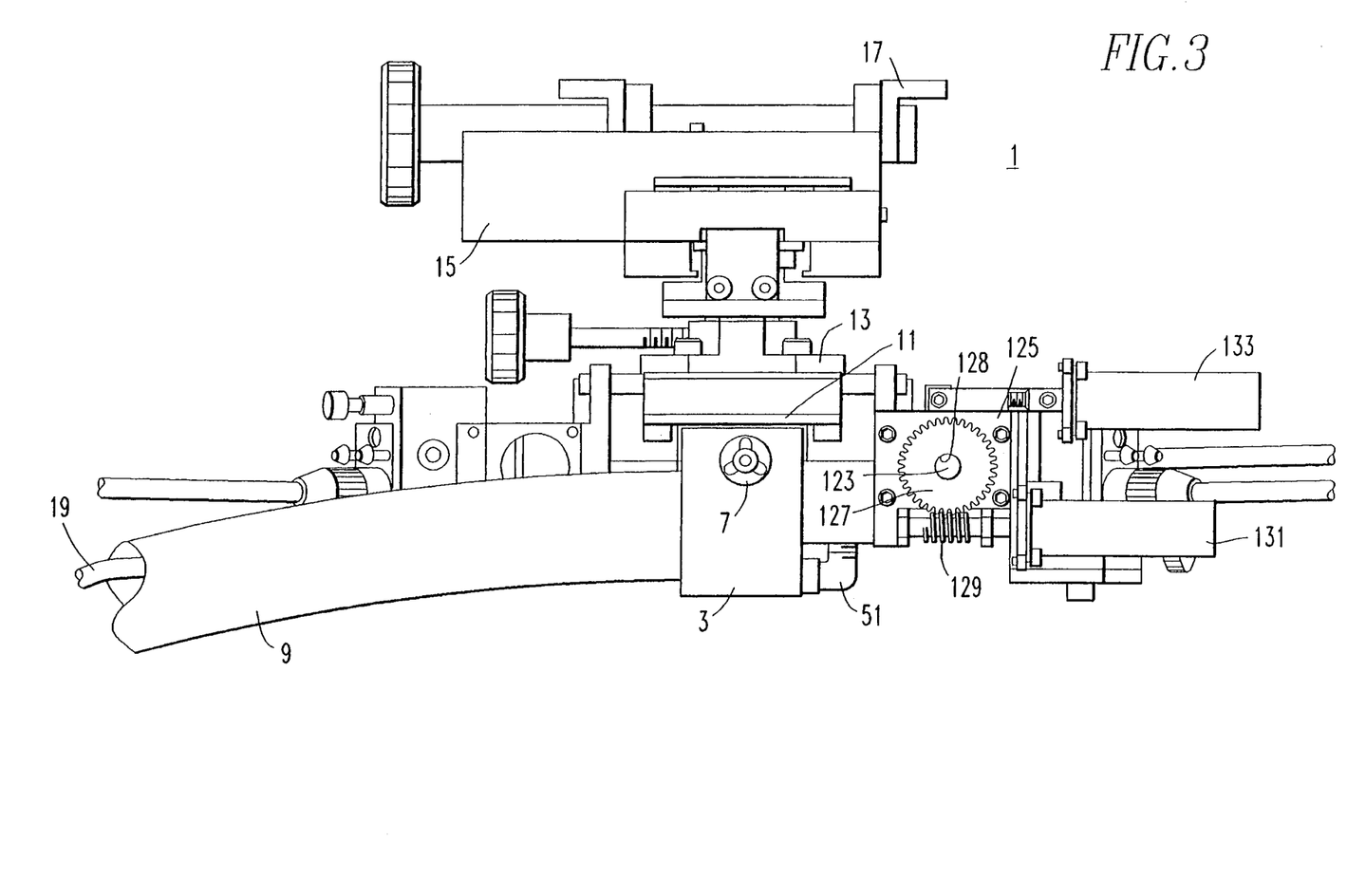
FIG. 3 is a plan view of the front end assembly shown in FIG. 1.

Referring to FIGS. 1-3, the front end assembly 1 has a bracket 3 for attaching and supporting the front end assembly 1 to a tractor mechanism (not shown) of the motorized welding apparatus. The heart of the front end assembly 1 is a torch block 3 which supports and provides energization to a welding electrode 5. A back cap 7 cooperates with a collet (not shown) within the torch block 3 to clamp the electrode for selective extension of the electrode downward from the torch block.

The torch block 3 provides electrical energization to the electrode 5. Electric power is supplied to the torch block 3 through a torch cable 9. The torch cable 9 also contains conduits (not shown) which circulate cooling water through the torch block 3 to remove heat generated within the torch block. The torch block 3 is mounted through an insulator block 11 to a torch mounting bracket 13. The mounting bracket 13 is carried by a motorized vertical axis assembly (MVAA) 15 which raises and lowers the front end assembly 1 as seen in FIGS. 2 and 3 for adjusting the length of the arc struck by the electrode during welding. The MVAA 15 in turn is carried by a mounting bracket 17 which secures the front end assembly 1 to a tractor mechanism (not shown) of the motorized welding apparatus. As is known in the art, the front end assembly 1 provides several degrees of freedom for adjusting the position and orientation of the electrode 5 relative to the parts to be welded.

The torch block 3 also supplies a cover gas for the welding process. This cover gas is supplied to the torch block 3 through a conduit 19 within the torch cable 9. Typically, argon is used as an inert cover gas. This first flow of cover gas is directed by a primary gas cup 2 1 along the electrode 5. This first flow of cover gas is delivered to the primary gas cup 21 through a conventional gas lens 23 which extends downward around the electrode 5 from the torch block 3. The primary gas cup 21 is tubular and internally threaded to engage external threads on the primary gas lens 23.

Figure 4:
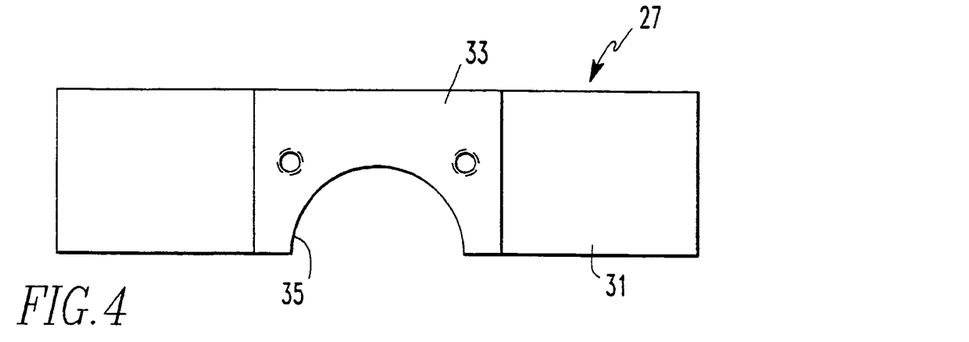
FIG. 4 is a plan view of one-half of a secondary gas cup which forms part of the front end assembly shown in FIGS. 1–3.
Figure 5:
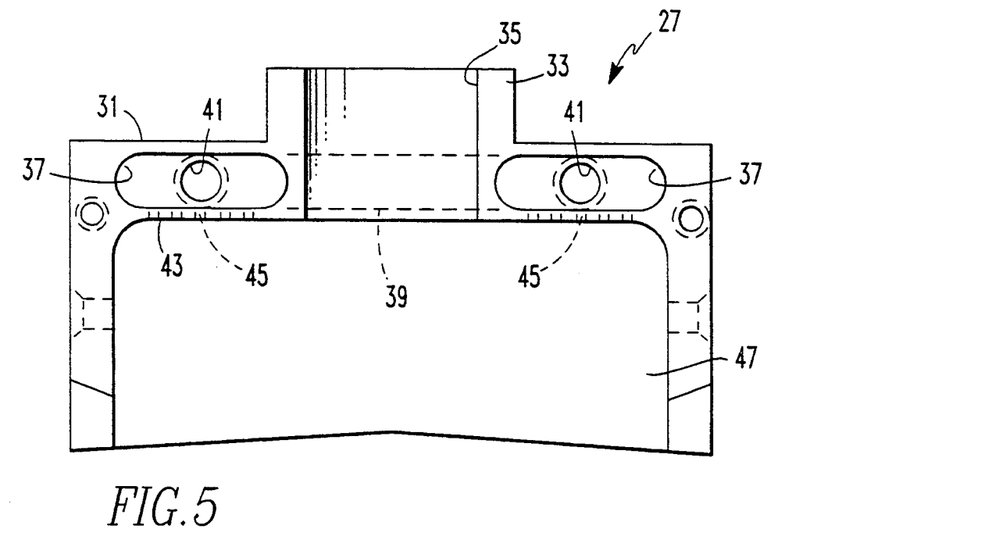
FIG. 5 is a side view looking into the half of the secondary gas cup shown in FIG. 4.
Figure 6:
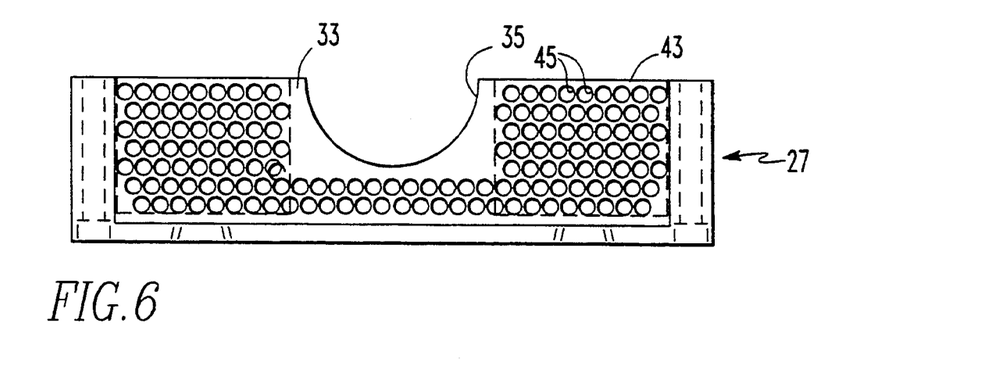
FIG. 6 is a bottom view of the one-half of the secondary gas cup shown in FIGS. 4 and 5.

The portions of the front end assembly 1 described to this point are conventional and well known in the art. In order to adapt this conventional welding equipment for narrow groove welding, a secondary gas cup 25 is provided. This secondary gas cup 25 surrounds the primary gas cup 21. As can be seen from FIGS. 4-6, the secondary gas cup 25 in a preferred embodiment, is formed from two body halves 27 which join at a central, longitudinally extending parting line 29. Each body half 27 has an end wall 31 with a raised center section 33 having a semi-circular bore 35 therethrough. These end walls have transverse passages 37 which are intersected by a plugged longitudinal bore 39. The fight body half 27 shown in FIGS. 3-6 has a pair of threaded ports 41 in side wall 43 which communicate with the transverse passages 37. As seen in the bottom view of FIG. 6, thin portions 43 of the end wall 31 have a number of small apertures 45 which interconnect the transverse passages 37 and the longitudinal bores 39 with a main flow chamber 47. As can be seen in FIGS. 2 and 3, a pair of hoses 49 are connected through fittings 51 threaded into the ports 41 to supply additional inert gas which circulates through the transverse passages 37 and longitudinal bores 39 and is diffused into the main flow chamber 47 through the apertures 45.

Figure 8:
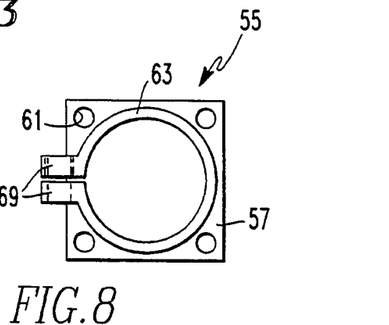
FIG. 8 is a plan view of a mount for the secondary gas cup.
Figure 9:
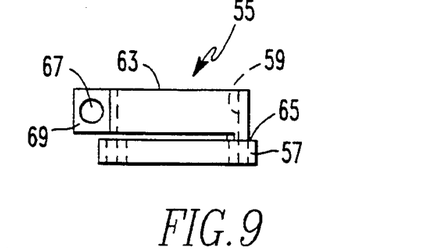
FIG. 9 is a side view of the mount of FIG. 8.

The two body halves 27 of the secondary gas cup 25 are joined together along the parting line 29 by screws 53. The assembled secondary gas cup slides over the primary gas cup 21 which extends through the confronting semicircular bores 35. The secondary gas cup is secured in place by a mount 55. This mount which is best seen in FIGS. 8 and 9 has a square base plate 57 with a circular opening 59 in the center which is secured to the raised sections 33 on the body halves 27 by screws 61. A clamp 63 is secured at 65 to the base plate 57. A bolt 67 threaded through ears 69 in the clamp 63 secures the secondary gas cup 25 coaxially around the shield 71 or primary gas cup 23.

Figure 10:
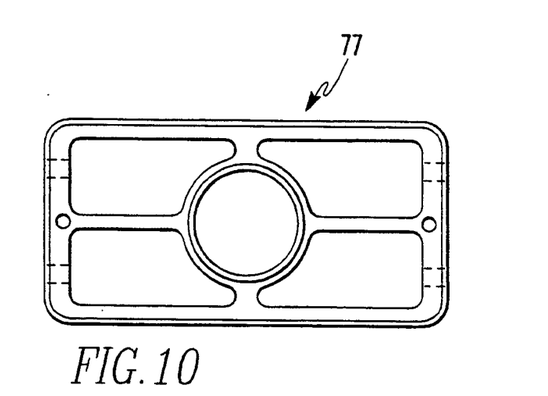
FIG. 10 is a plan view of the female screen holder for the secondary gas lens.

The secondary gas cup 25 is provided with a secondary gas lens 73. The secondary gas lens includes screens 75 clamped between a female screen holder 77 (see FIG. 10) and a complimentarily configured male screen holder 79 (see FIG. 3). The secondary gas lens 73 is secured in the main flow chamber 47 within the secondary gas cup 25 by screws 81. Flow of the additional inert cover gas through the secondary gas lens 73 produces laminar flow around the laminar flow of covered gas produced by the primary gas cup 21 and its gas lens 23.

Figure 7:
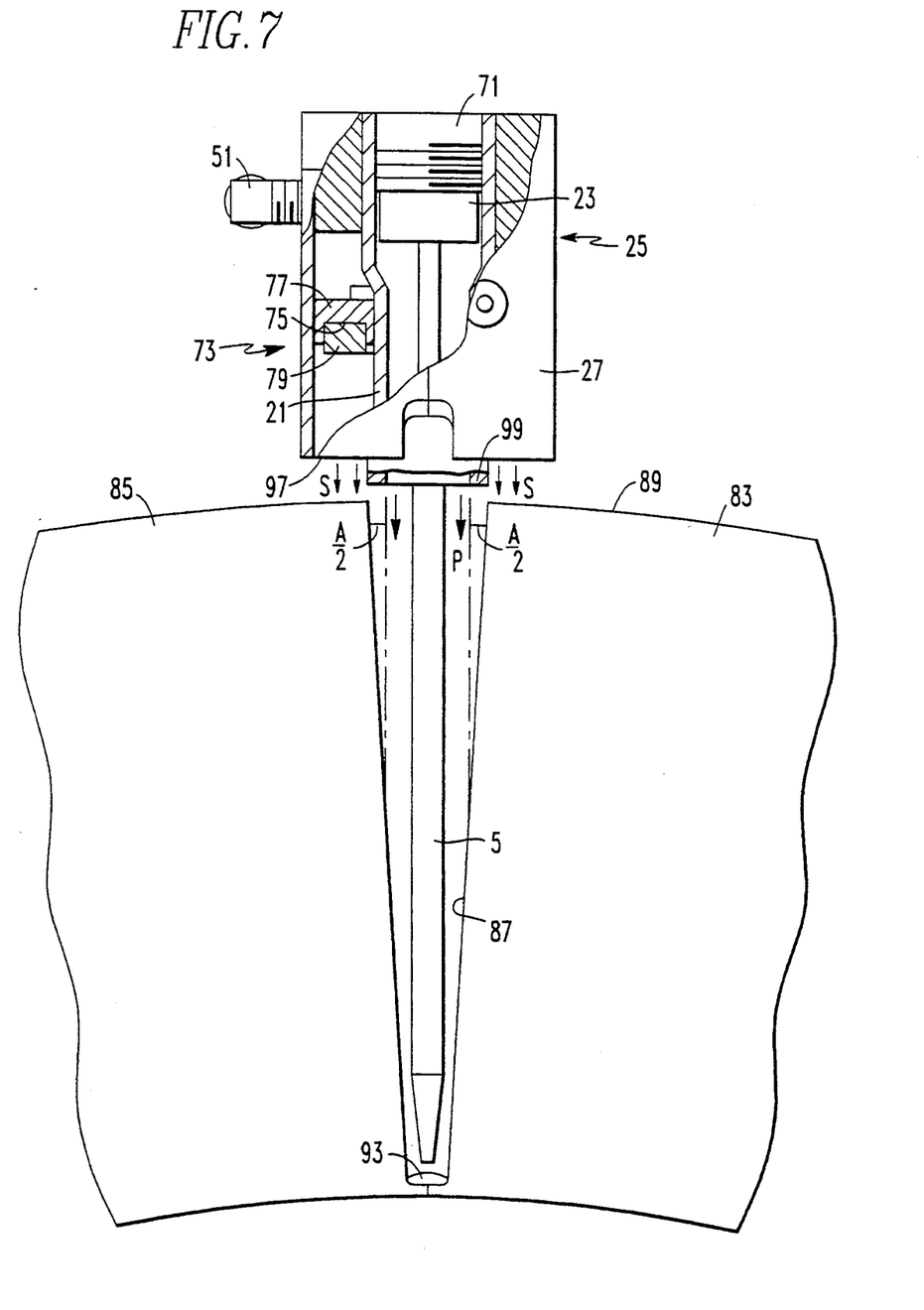
FIG. 7 is a section through a work-piece prepped for narrow groove welding and showing the welding apparatus of the invention in place for welding.
Figure 11:
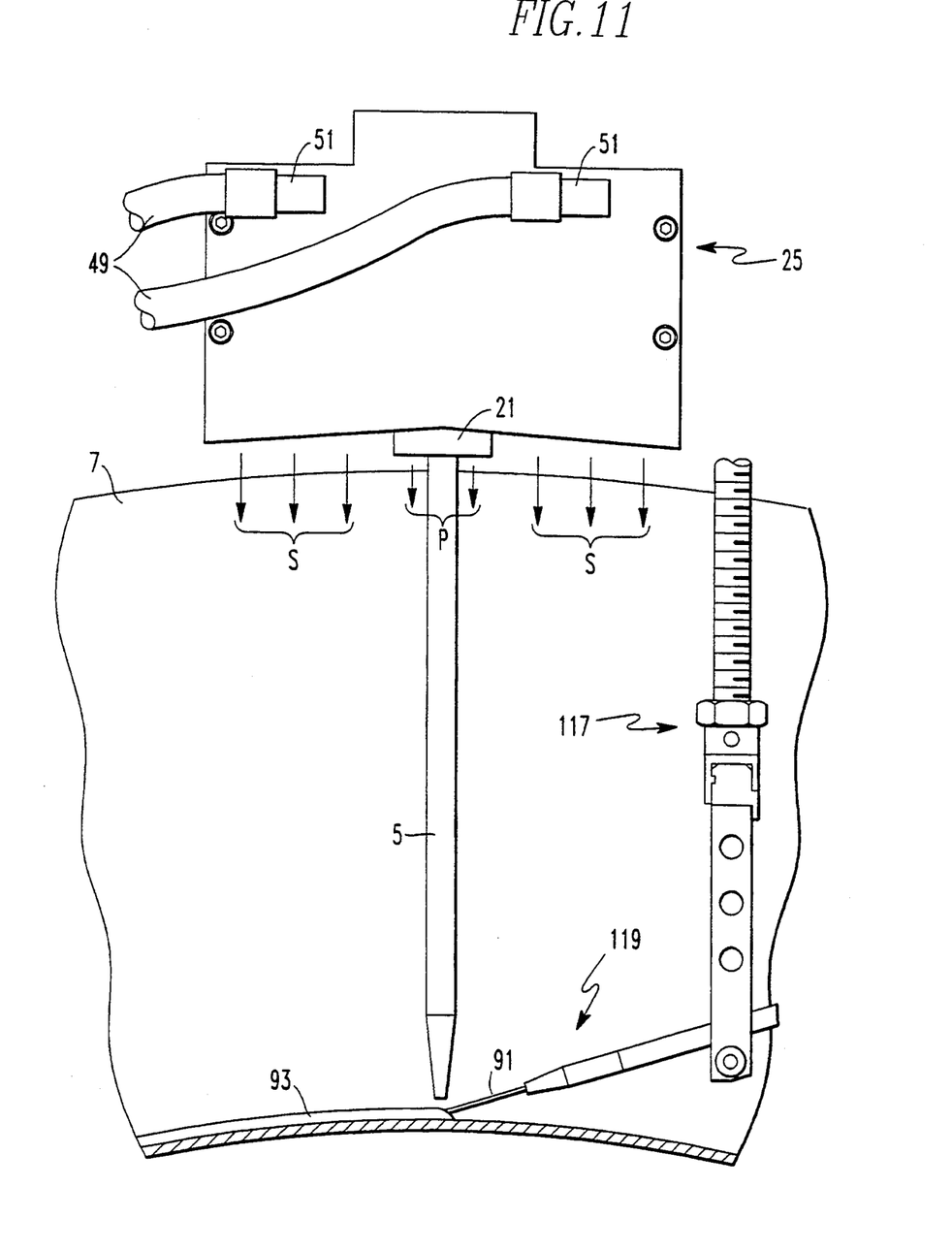
FIG. 11 is a longitudinal section through the narrow groove of FIG. 7.

FIG. 7 shows the pertinent parts of the welding apparatus of the invention in place for performing a narrow groove weld. The work pieces 83 and 85 to be joined are prepped to form a narrow groove 87 where fitted together as shown. Each side of the groove 87 forms an angle A/2 which together for an included angle A. In the exemplary work-piece shown, this included angle A is about 6°. As discussed above narrow grooves generally form an included angle of less than about 20° up to 50°. As shown in FIG. 7 the front end assembly is positioned so that the electrode 5 extends into the narrow groove 87 with the primary gas cup 21 and secondary gas cup 25 spaced just above the upper surface 89 of the work pieces 83-85. As shown in FIG. 11, which is a longitudinal view through the narrow groove 87 shown in FIG. 7, the electrode 5 strikes an arc which melts welding wire 91 to form a weld puddle 93.

A cover gas for welding processes is provided by a gas distribution system 95 which includes the conduit 19 supplying gas to the primary gas cup 21 and the hoses 49 supplying additional cover gas to the secondary gas cup 25. The laminar flow of cover gas from the primary gas cup 21 is shown in FIGS. 7 and 11 by the arrows P, is surrounded by a second diameter gas flow from a secondary gas cup 25 indicated by the arrows S. These combined gas flows P and S form a large envelope of laminar gas flow which provides effective cover gas for deep narrow groove welds.

The large secondary gas cup 25 has a flow opening 97 which has at least three times and preferably four to ten times, the cross-sectional area of the flow opening 99 of the primary gas cup 21. Also, the flow rate of the second gas flow from the secondary gas cup 25 is at least about twice and preferably 2.5 to 10 times the rate of gas flow from the primary gas cup 21 depending on the diameter of the primary gas cup. Typically, the primary gas cup has a flow rate of about 40 70 CFH while the flow rate from the secondary gas cup is about 150–300, but preferably 200–250 CFH. Of course, the specific gas flow rates are related to the size of the flow openings of the respective gas cups. However, these exemplary figures illustrate suitable relative flow rates. An important factor is that the cover gas flow be laminar to assure good welds.

In making deep narrow groove welds it is preferred that the rectangular secondary gas cup have unequal length adjacent sides as shown in FIGS. 1–7. However, for shallower narrow groove welds the rectangular secondary gas cup can be square.

Figure 12:
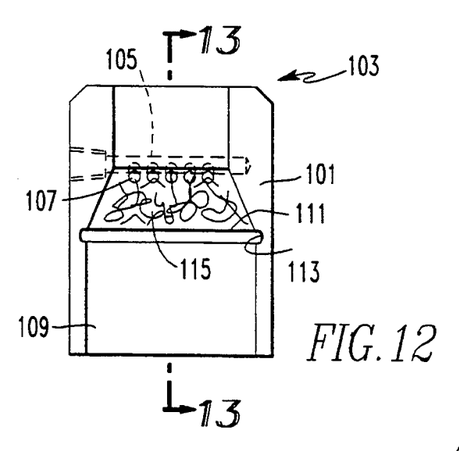
FIG. 12 is a side view of one-half of a second embodiment of the secondary gas cup.
Figure 13:
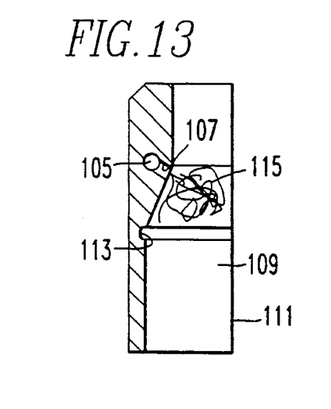
FIG. 13 is a vertical section through the secondary gas cup of FIG. 12 taken along the line 13—13.
Figure 14:
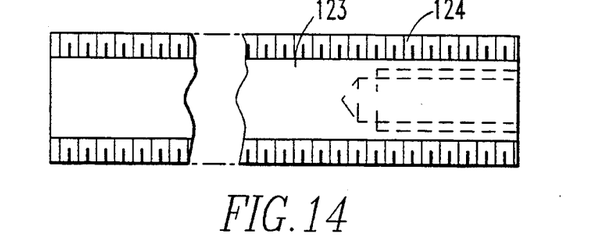
FIG. 14 is a side view of a manipulator post in accordance with the invention.
Figure 15:
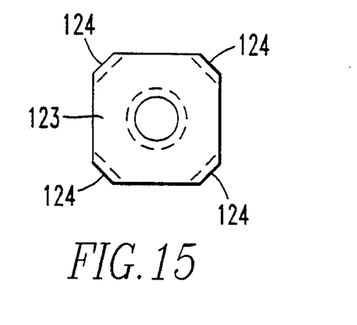
FIG. 15 is an end view of the manipulator post of FIG. 14.

An example of a body of 101 for a square secondary gas cup 103 is shown in FIGS. 12 and 13. Each body half 101 has a transverse bore 105 with apertures 107 leading to the main flow chamber 109. A screen plate 111 seated in a groove 113 in the body half 101 retains steel wool within the secondary gas cup 103 to form a gas lens for laminar flow Returning to FIGS. 1–3 the front end assemble 1 also supports a weld-wire manipulator 17. This manipulator 17 includes a wire nozzle assembly 119 through which weld-wire is feed toward the electrode 5. This wire nozzle assembly 119 is supported by a nozzle holder 121. This nozzle holder 121 in turn is suspended by a unique manipulator post 123 as shown in FIG. 14 and 15. This post 123 is a square rod with threads 124 only on the corners which, as discussed below, prevents counter-rotation of the post during extension and retraction. The manipulator post 123 extends through a housing 125 and engages a gear 127 which is captured in the housing. This gear 127 has a threaded aperture 128 which engages the threads on the corners of the manipulator rod 123 to raise and lower the rod and therefore the wire nozzle assembly 119. The gear 127 is rotated through a worm gear 129 on the output shaft of a motor 131 which can be operated to automatically position the nozzle assembly 119 vertically. A second motor 133 selectively rotates the square manipulator shaft 123 about its axis.

Figure 16:
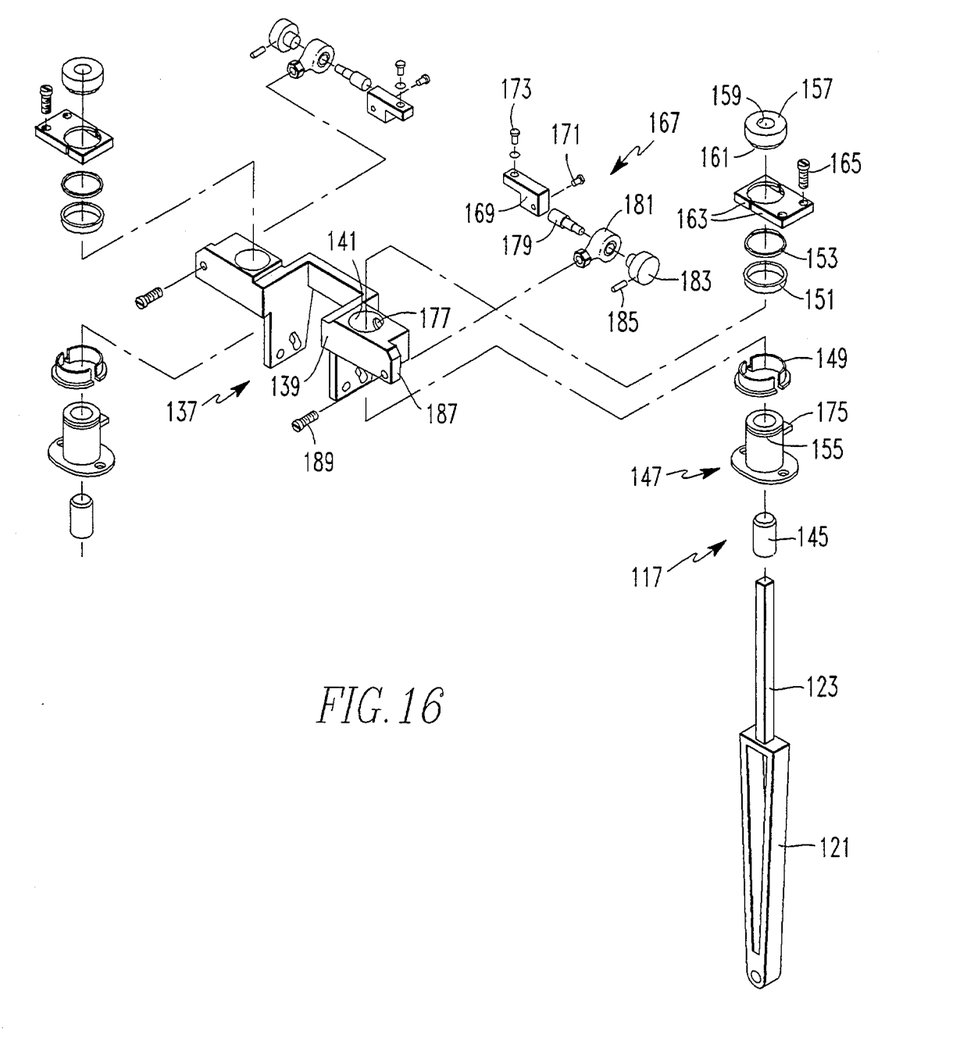
FIG. 16 is an exploded view of a manual wire manipulator in accordance with the invention.

FIG. 16 is an exploded view of a manual embodiment of the wire manipulator. This manual manipulator 135 includes a bracket 137 which is mounted to the torch block. The bracket 137 mount identical manual manipulators 135 on each side of the torch block. Since these manual manipulators are identical, only one will be described.

The bracket 137 has an arm 139 with a bore 141 therethrough which forms a housing. As can be seen in FIGS. 14 and 15 the square manipulator post 123 has threads 124 on the corners. This square post slides through a square opening in a cylindrical brass bushing 145 which is press fit into a pivot cylinder 147. A split lower bearing 149 which bears against a flange 15 1 on the lower end of the pivot cylinder 147 and an upper beating 51 secured by a snap ring 153 which seats in a groove 155 in the pivot cylinder 147 lock the pivot cylinder in the bore 141. An knob 157 with a threaded bore 159 which engages the manipulator post 123 has a groove 161 which is engaged by the two halves 163 of a locking plate secured by screws 165 to the arm 139 to capture the knob 157. Rotation of the captured knob 157 raises and lowers the manipulator post 123. The post 123 is of sufficient length to provide full extension for deep welds. This is a marked improvement over presently available manipulators which have short stems which require changing manipulator rods as the weld is built up.

Angular adjustment of the manipulator nozzle assemble 119 about the axes of the manipulator post 123 is achieved by an adjustment device 167. This adjustment device includes a bellcrank 169 pivotally mounted on the arm 139 by a screw 171 and secured by a screw 173 to a crank arm 175 which protrudes through a lateral bore 177 in the arm 139. An actuating rod 179 is threaded at one end into the bellcrank 169 and at the other end passes through a brass eyebolt 181 and is captured in a knob 183 by a pin 185. The eyebolt 181 is pivotedly mounted to a flange 187 on the arm 139 by screw 189. Rotation of the knob 183 causes rotation of the pivot cylinder 147 which rotates the square manipulator post 123 to adjust the angular position of the nozzle assemble 119.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. Apparatus for welding parts fitted together with a narrow welding groove having an opening for predetermined width, said apparatus comprising:
   a welding torch;
   a welding electrode extending from said welding torch;
   a primary gas cup surrounding said electrode at said torch substantially above said narrow welding groove,
   a secondary gas cup surrounding said primary gas cup and having a width greater than said predetermined width of said opening of said narrow welding groove; and
   gas distribution means providing a first laminar flow of a cover gas to said primary gas cup which directs said first laminar flow of cover gas along said electrode from substantially above said narrow welding groove, and providing a second laminar flow of said cover gas to said secondary gas cup which directs said second laminar flow of said cover gas along said primary gas cup and electrode around said first laminar flow of cover gas, said second laminar flow of cover gas being at least as wide as said predetermined width of said opening of said narrow groove.

2. The apparatus of claim 1 wherein said secondary gas cup is removably mounted over said primary gas cup.

3. The apparatus of claim 1 wherein said secondary gas cup has a gas lens surrounding said primary gas cup.

4. The apparatus of claim 1 wherein said primary gas cup has a gas flow opening with a first cross-sectional area and said secondary gas cup has a gas flow opening with a second cross-sectional area which is at least about three times said first cross-sectional area.

5. The apparatus of claim 4 wherein said first flow of cover gas from said primary gas cup has a first flow rate and said second flow of cover gas from said secondary gas cup has a second flow rate which is at least about twice said first gas flow rate.

6. The apparatus of claim 4 wherein said second cross-sectional area of said gas flow opening of said secondary gas cup is about four to ten times larger than said first cross-sectional area of said gas flow opening of said primary gas cup.

7. Apparatus of claim 6 wherein said first flow of cover gas from said primary cup has a first flow rate and said second flow of cover gas from said secondary gas cup has a second flow rate which is about 2.5 to 10 times said first flow rate.

8. The apparatus of claim 7 wherein said gas flow opening of said secondary gas cup has a length greater than a width.

9. The apparatus of claim 8 wherein said gas flow opening of said primary gas cup is generally circular and centered within said generally rectangular flow opening of said secondary gas cup.

10. Apparatus for welding pans fitted together with a narrow welding groove having an opening of predetermined width, apparatus comprising:
  a welding torch;
  a welding electrode extending from said welding torch;
  a primary gas cup surrounding said electrode at said torch substantially above said narrow welding groove,
  a secondary group surrounding said primary gas cup and having a width greater than said predetermined width of said opening of said narrow welding groove; and
  gas distribution means providing a first laminar flow of a cover gas to said primary gas cup which directs said first laminar flow of cover gas along said electrode from above said narrow welding groove, and providing a second laminar flow of said cover gas to said secondary gas cup which directs said second laminar flow of said cover gas along said primary gas cup and electrode around said first laminar flow of cover gas said second laminar flow of cover gas being at least as wide as said predetermined width of said opening of said narrow groove, said primary gas cup being generally circular, said secondary gas cup being generally rectangular and substantially coaxially mounted with respect to said primary gas cup.

11. Apparatus for welding pans fitted together with a narrow welding groove having an opening of predetermined width, said apparatus comprising:
  a welding torch;
  a welding electrode extending from said welding torch;
  a primary gas cup surrounding said electrode at said torch substantially above said narrow welding groove,
  a secondary gas cup surrounding said primary gas cup and having a width greater than said predetermined width of said opening of said narrow welding groove; and
  gas distribution means providing a first laminar flow of a cover gas said primary gas cup which directs said first laminar flow of cover gas along said electrode from above said narrow welding groove, and providing a second laminar flow of said cover gas to said secondary gas cup which directs said second laminar flow of said cover gas along said primary gas cup and electrode around said first laminar flow of cover gas, said second flow of cover gas being at least as wide as said predetermined width of said opening of said narrow groove, said secondary gas cup being elongated, having a length greater than said width.

12. A method of welding parts fitted together with a narrow weld groove, comprising the steps of:
  inserting an energized welding electrode into said narrow weld groove and feeding weld material toward said electrode to form a weld puddle in said narrow weld groove:
  directing a first substantially laminar flow of an inert cover gas around said electrode toward said weld puddle from substantially outside said groove; and
  directing a second substantially laminar flow from substantially outside said groove of an inert cover gas coaxially around said first substantially laminar flow of said inert cover gas toward said weld puddle, said second substantially laminar flow having a width at least as great as said predetermined width of said opening of said narrow welding groove.

13. The method of claim 12 wherein said second substantially laminar flow of cover has a generally oblong cross section with a length greater than width of said second substantially laminar flow of cover gas.

14. The method of claim 13 wherein said first substantially laminar flow of an inert cover gas has a first cross-sectional area and said second substantially laminar flow of an inert cover gas has a second cross-sectional area which is at least about three times said first cross-sectional area.

15. The method of claim 14 wherein said first substantially laminar flow of an inert cover gas has a first flow rate and said second substantially laminar flow of an inert gas has a second flow rate which is at least about twice said first flow rate.

16. The method of claim 15 wherein said second cross-sectional area is about 4 to 10 times said first cross-sectional area and said second flow rate is about 2.5 to 10 times said first flow rate.

17. Apparatus for adapting for welding in a narrow groove having an opening with a predetermined width, welding means having a welding electrode supported by a torch block and surrounded by a primary gas cup through which a cover gas is directed along said electrode substantially from above said narrow groove, said apparatus comprising: a secondary gas cup surrounding said primary gas cup and being wider than said predetermined width of said opening in said narrow groove, and gas distribution means providing additional laminar flow of cover gas to said secondary gas cup which directs said additional laminar flow of cover gas along said electrode around said laminar flow of cover gas directed by said primary gas cup along said electrode.

18. Apparatus for adapting for welding in a narrow groove having an opening with a predetermined width, welding means having a welding electrode supported by a torch block and surrounded by a primary gas cup through which a cover gas is directed along said electrode substantially from above said narrow groove, said apparatus comprising: a secondary gas cup surrounding said primary gas cup and being wider than said predetermined width of said opening in said narrow groove, and gas distribution means providing additional cover gas to said secondary gas cup which directs said additional cover gas in a laminar flow along said electrode around said cover gas directed by said primary gas cup along said electrode, said secondary gas cup being oblong and including mounting means removably mounting said secondary gas cup substantially centered with respect to said first gas cup.

19. The apparatus of claim 18 wherein said secondary gas cup has diffuser means distributing said additional cover gas around said primary gas cup and gas lens means surrounding said primary gas cup.

20. Apparatus for welding parts fitted together with a narrow welding groove having an opening with a predetermined width, said apparatus comprising:
   a welding torch;
   a welding electrode extending from said torch and insertable into said narrow welding groove to form a weld puddle at a bottom of said narrow welding groove;
   wire manipulator means extending into said narrow welding groove for feeding welding wire to said electrode; and
   means substantially outside of said narrow welding groove directing a laminar flow of a cover gas along said electrode and into same narrow welding groove, said laminar flow of cover gas having a width at least as great as said predetermined width of said opening of said narrow welding groove and a length along said narrow welding groove which extends beyond said electrode in each direction along said narrow welding groove a distance sufficient to maintain an effective envelope of said cover gas covering said weld puddle to a depth in said narrow welding groove of at least about three inches.

21. The apparatus of claim 20 wherein said means directing said laminar flow of cover gas comprises means directing said cover gas into said laminar flow with said length of said laminar flow of cover gas along said narrow welding groove greater than said width of said laminar flow of cover gas.

22. The apparatus of claim 22 wherein said means directing said laminar flow of cover gas comprises means directing said cover gas into a generally rectangular laminar flow with said length along said narrow welding groove greater than said width of said laminar flow of cover gas.

23. The apparatus of claim 20 wherein said means directing said laminar flow of cover gas comprises means directing said cover gas into a laminar flow which is generally square.

24. The apparatus of claim 20 wherein said means directing said laminar flow of cover gas comprises a primary gas cup surrounding said electrode adjacent said welding torch and directing a first portion of said laminar flow of cover gas along said electrode and a secondary gas cup surrounding said primary gas cup and directing a second portion of said laminar flow of a cover gas around said primary gas cup along said electrode.

25. The apparatus of claim 20 wherein said means directing a laminar flow of cover gas comprises cup means, gas lens means and sealing means sealing said gas lens to said cup means to prevent cover gas from by-passing between said cup means and said gas lens.

26. The apparatus of claim 25 wherein said sealing means comprises a peripheral groove within said cup means within which said gas lens seats.

27. The apparatus of claim 26 wherein said cup means comprises confronting cup halves and said peripheral groove comprises confronting peripheral groove halves in said confronting cup halves.

28. The apparatus of claim 25 wherein said sealing means seals said gas lens around said welding electrode.

29. The apparatus of claim 28 wherein said gas lens comprises steel wool.

30. The apparatus of claim 20 wherein said means directing a laminar flow of cover gas comprises cup means and steel wool within said cup means.

31. Apparatus for welding parts fitted together with a narrow welding groove having an opening with a predetermined width, said apparatus comprising:
   a welding torch;
   a welding electrode extending from said welding torch and into said narrow groove to form a weld puddle at a bottom of said narrow welding groove;
   wire manipulator means extending into said narrow welding groove for feeding welding wire to said electrode; and
   means substantially outside of said narrow welding groove directing a laminar flow of cover gas along said electrode and into said narrow welding groove, said laminar flow of cover gas having a width at least as great as said predetermined width of the narrow welding groove, and a length along said narrow welding groove which is greater than said width of said laminar flow of cover gas and which extends beyond said electrode in each direction along said narrow welding groove a distance sufficient to maintain an effective envelope of said cover gas covering said weld puddle.

32. The apparatus of claim 31 wherein said means directing said laminar flow of cover gas comprises means directing a generally rectangular laminar flow of cover gas.

33. The apparatus of claim 32 wherein said means directing said laminar flow of cover gas comprises a primary gas cup surrounding said electrode adjacent said welding torch and directing a first portion of said laminar flow of cover gas along said electrode and a secondary gas cup surrounding said primary gas cup and directing a second portion of said laminar flow of a cover gas around said primary gas cup along said electrode.

34. A manipulator for feeding weld-wire toward welding apparatus, said apparatus comprising:
   a support secured to said welding apparatus and having a non-circular aperture extending therethrough;
   a non-circular manipulator post slidably extending through but not rotatable within said non-circular aperture in said support and having screw threads on longitudinally extending surfaces thereof;
   a rotatable member engaged by said support and having a threaded bore therethrough which engages the screw threads on the longitudinally extending surfaces of said manipulator post to advance and retract said manipulator post relative to said support; and
   wire feed means carried by said manipulator post through which weld-wire is fed.

35. The manipulator of claim 34 wherein said support includes means selectively rotating said non-circular manipulator post to angularly position said wire feed means carried by said manipulator post.

36. The manipulator of claim 34 wherein said non-circular aperture in said support is a square aperture, said non-circular manipulator post is square, and said longitudinally extending surfaces are longitudinally extending corner edges of said square manipulator post.

37. The manipulator of claim 36 wherein said support includes a housing with a cylindrical bore therethrough, a pivot cylinder rotatable in said cylindrical bore and having said square aperture extending therethrough in which said square manipulator post is slidable, and means selectively rotating said pivot cylinder in said cylindrical bore of said housing.

38. The manipulator of claim 34 adapted for use with apparatus welding in a narrow groove with a depth of at least three inches wherein said non-circular manipulator post has a length sufficient to advance and retract said feed means carried by said manipulator post through which weld-wire is fed at least three inches, whereby said manipulator post adjustably positions said feed means throughout welding of said narrow groove.

39. A method of welding parts fitted together with a narrow welding groove having an opening with a predetermined width, said method comprising the steps of:
   inserting an energized welding electrode into said narrow welding groove and feeding weld material toward said electrode to form a weld puddle in said narrow welding groove, and
   directing a laminar flow of cover gas along said electrode and into said narrow welding groove from above said narrow welding groove, said laminar flow of cover gas having a width at least as great as said predetermined width of said opening of said narrow welding groove and a length along said narrow welding groove which extends beyond said electrode in each direction along said narrow welding groove a distance sufficient to maintain an effective envelope, of said cover gas covering said weld puddle to a depth in said narrow welding groove of at least about three inches.

40. The method of claim 39 wherein said step of directing a laminar flow of cover gas along said electrode and into said narrow welding groove comprises directing said laminar flow with said length of said laminar flow of cover gas along said narrow welding groove being greater than said width of said laminar flow of cover gas.

41. A method of welding pans fitted together with a narrow welding groove having an opening with a predetermined width, said method comprising the steps of:
   inserting an energized welding electrode into said narrow welding groove and feeding weld material toward said electrode to form a weld puddle in said narrow welding groove, and
   directing a laminar flow of cover gas along said electrode and into said narrow welding groove from above said narrow welding groove, said laminar flow of cover gas having a width at least as great as said predetermined width of the narrow welding groove, and a length along said narrow welding groove which is greater than said width of said laminar flow of cover gas and which extends beyond said electrode in each direction along said narrow welding groove a distance sufficient to maintain an effective envelope of said cover gas covering said weld puddle.

42. The method of claim 41 wherein said step of directing said laminar flow of cover gas along said electrode and into said narrow welding groove comprises directing such a laminar flow of cover gas which is generally rectangular.

* * * * *

UNITED STATES PATENT AND TRADEMARK OFFICE
CERTIFICATE OF CORRECTION

PATENT NO. : 5,373,139

DATED : December 13, 1994

INVENTOR(S) : Charles E. Burgoon, et al

Page 1 of 2

It is certified that error appears in the above-indentified patent and that said Letters Patent is hereby corrected as shown below:

Column 4, line 6, delete,

"fight" and substitute --right--.

Column 5, line 11, delete,

"40 70" and substitute --40-70--.

Col. 7, line 24,
In Claim 9, line 3, delete "generally rectangular".

Col. 7, line 26,
In Claim 10, line 1, delete "pans" and substitute --parts--; same claim, line 35, delete "group" and substitute --gas cup--; same claim, line 22, insert a comma after "gas".

In Claim 11, line 1, delete "pans" and substitute --parts--.

Column 9, line 42,
In Claim 22, line 1, delete "22" and substitute --21--.

UNITED STATES PATENT AND TRADEMARK OFFICE
CERTIFICATE OF CORRECTION

PATENT NO. : 5,373,139  Page 2 of 2
DATED : December 13, 1994
INVENTOR(S) : Charles E. Burgoon, et al It is certified that error appears in the above-indentified patent and that said Letters Patent is hereby corrected as shown below:

Column 12, line 11,
In Claim 41, line 1, delete "pans" and substitute --parts--.

Signed and Sealed this

Twenty-fifth Day of April, 1995

Attest:

BRUCE LEHMAN

*Attesting Officer*   *Commissioner of Patents and Trademarks*